United States Patent [19]

Hasegawa et al.

[11] Patent Number: 4,701,473
[45] Date of Patent: Oct. 20, 1987

[54] CATALYST FOR PRODUCING POLYURETHANE FOAMS COATED WITH SKIN

[75] Inventors: Masazumi Hasegawa; Shoji Arai; Shinya Mizoe, all of Yamaguchi, Japan

[73] Assignee: Toyo Soda Manufacturing Co., Ltd., Shinnanyo, Japan

[21] Appl. No.: 877,403

[22] Filed: Jun. 23, 1986

[30] Foreign Application Priority Data

Jun. 27, 1985 [JP] Japan ................................ 60-139121

[51] Int. Cl.$^4$ ............................................. C08G 18/14
[52] U.S. Cl. .................................. 521/118; 264/45.5; 264/45.6; 264/51; 264/331.19; 427/393.5; 521/51; 521/166
[58] Field of Search .......................... 521/118, 166, 51; 264/331.12, 331.16, 45.5, 45.6, 51, 331.19; 427/393.5

[56] References Cited

U.S. PATENT DOCUMENTS 4,590,223  5/1986  Arai et al. ........................ 521/118

*Primary Examiner*—Maurice J. Welsh
*Attorney, Agent, or Firm*—Cushman, Darby & Cushman

[57] ABSTRACT

Amine catalysts useful for producing polyurethane foams coated with skin by reaction of an organic polyisocyanate with a polyol. The catalysts comprise 4-methyl-1-(2-hydroxyalkyl)-piperazine, and emit no bad odor, give excellent moldability and are free from deterioration of skin and discoloration of covering materials.

14 Claims, No Drawings

CATALYST FOR PRODUCING POLYURETHANE FOAMS COATED WITH SKIN

BACKGROUND OF THE INVENTION

1. Field of the Invention

The present invention relates to the amine catalysts useful for producing polyurethane foams coated with skin. More particularly, the invention relates to the amine catalysts useful for producing polyurethane foams coated with skin, which emit no bad odor, give excellent moldability, and are free from deterioration of skin and discoloration of covering materials.

2. Description of Related Arts

Polyurethane foams are usually prepared by the reaction of solution A with solution B under high speed mixing agitation, solution A containing polyol, blowing agents, surfactant, catalyst and other promotor and solution B containing polyisocyanate.

Polyurethane foams coated with skin have a wide range of applications. Among them the most common usage is for interior materials of automobile such as for cushion, arm rest, head rest, instrument panel and dash board. These products are usually coated with urethane elastomer, vinyl chloride resin or a complex of ABS and vinyl chloride resins, and frequently they are prepared in a united product.

On the other hand, tertiary amine catalysts, employed in the production of polyurethane foams, are partly lost by evaporation and the rest remains in the product foams. Amine compounds usually have peculiar amine odor which emits a bad smell and imparts bad influences to the working condition or further to the environmental problem. Amine compounds, if left in the foam, may bleed toward the outside of the foam and react with vinyl chloride in the skin to accelerate dehydrochlorination and to discolor the skin. In other instance, halogen compounds such as fire retardant in the foam composition, react with the remaining amine compounds to produce halides which often discolor the skin.

So far, the discoloration of the skin has been avoided by increasing the thickness of the skin to lessen the breed of the amine catalyst, but it brings about a large cost disadvantage. On the other hand, a variety of amine catalysts have been proposed. For example, they include a catalyst which is reactive with raw material isocyanate (Japanese Laid-Open Patent Application No. Sho 58-17115) and a catalyst having a high molecular weight to reduce the breeding speed (Japanese Laid-Open Patent Application No. Sho 54-20099). However, there still remained a problem that amine catalysts which deteriorated and discolored the skin to a lesser degree did not always provide better physical properties of the foam. Thus, most eagerly desired was an amine catalyst which eliminates these problems.

4-Methyl-1-(2-hydroxyalkyl)piperazine has been disclosed by some of the present inventors and is one of the known tertiary amine catalysts. However, there has not been described that the 4-methyl-1-(2-hydroxyalkyl)-piperazine is a catalyst useful to prevent deterioration and discoloration of polyurethane products coated with skin, and further there is not found an example in which the compound has been utilized in this field.

SUMMARY OF THE INVENTION

Considering the above-mentioned circumstances, the present invention intends to provide an amine catalyst which, when employed for the production of urethane foams coated with skin, brings about a minimal degree of deterioration and discoloration of the skin, carries no bad odor for itself and is excellent in its physical properties of foaming and in preparing good moldability.

The present inventors have long devoted themselves to the investigation on the catalytic action of tertiary amines. In the production of urethane foams, a tertiary amine is necessarily used to make the foams with open cell structure. To overcome the serious problem of discoloration of urethane products, they formed four types of amine catalysts which could be used;

(1) an amine catalyst of a very low boiling point;
(2) an amine catalyst having a reactive group;
(3) an amine catalyst of a high molecular weight; and
(4) an amine catalyst of a high boiling point.

In (1), a very low boiling point amine catalyst is mostly evaporated in the course of production of urethane foams leaving no remainder of amine catalyst. However, as mentioned above, this kind of amine compound has intolerable bad odor, deteriorates the working condition, and in an extreme case it may bring about an environmental problem. Further, a low boiling compound such as this amine catalyst may evaporate while it is kept in a pre-mixed composition solution and the reaction may not proceed at the expected reaction rate. Therefore, (1) does not provide an effective means.

The remedy (3) seems a useful one, because an amine catalyst having a large molecular weight hardly breeds and also hardly evaporates. Emitting of bad odor of the amine is no longer feared. However, for an amine catalyst of a large molecular weight, the catalytic activity per unit weight is reduced and a larger amount is needed. In addition, the amine is more immiscible and some amines are solid at room temperature. Thus, (3) does not always provide a useful means.

The present inventors noted tertiary amine compounds which hold reactivity with isocyanate and the reactive functional group of which forms an amine catalyst of a higher boiling point due to formation of hydrogen bonds. In other words, they expected to solve the problem of deterioration of discoloration of the skin by the remedies (2) and (4), and their investigations were solely on the tertiary amine catalysts having these reactive groups. As a result, they found that, when 4-methyl-1-(2-hydroxyalkyl)piperazine (hereinafter designated as MHAP) or a mixture of MHAP and a specified amount of another tertiary amine compound was used as catalyst, skin of the product polyurethane showed very little deterioration and discoloration and physical properties as well as moldability of foams were excellent, and they succeeded in completion of this invention.

The present invention provides catalysts for producing polyurethane foams coated with skin which are excellent in their physical properties and moldability of foams and the skin of which is least deteriorated and discolored by the reaction of an organic polyisocyanate with a polyol in the presence of a blowing agent and other auxiliary agent, comprising useing as catalyst MHAP or a mixture of MHAP with a specified amount of another tertiary amine compound.

Since the catalyst of this invention contains a hydroxyl group which reacts with isocyanate, the catalyst reacts with isocyanate and is fixed in the urethane foam in the process of forming the foam and therefore the catalyst does not breed. Further, the catalyst of this invention having a high boiling point does not emit bad odor and hardly breeds from foams. Thus, when MHAP is used as polymerizing catalyst for polyurethane products coated with skin, deterioration and discoloration of skin can be reduced to a lesser degree. Furthermore, the catalyst of this invention makes a well-balanced progress between the blowing and the gelling reactions which compete in the urethane forming reactions. As a result, when solution A containing polyol and the other sub-raw materials is mixed with solution B of isocyanate, the resulting mixture is sufficiently fluidic to flow and fill every corner of a mold, even if it is of a complex shape, showing good moldability.

The polyurethane products obtained do not show any difference in their physical properties from those of previous products. Therefore, the catalyst of the present invention can be applied without making any change to the formulation.

DETAILED DESCRIPTION OF THE INVENTION

The present invention will be described in more detail.

The MHAP which is used in this invention may be prepared in a known process, for example, such as by the reaction disclosed in Japanese Laid-Open Patent Application No. Sho 58-162625.

The alkyl group of hydroxyalkyl of MHAP is selected from the group consisting of ethyl, n-propyl, n-butyl and iso-butyl, but preferably from ethyl and n-propyl groups.

Other tertiary amine compounds compatible with MHAP of this invention include known tertiary amines such as triethylamine, N,N-dimethylcyclohexylamine, N,N,N',N'-tetramethylethylenediamine, N,N,N',N'-tetramethylpropylenediamine, N,N,N',N'-tetramethylhexamethylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylguanidine, triethylenediamine, N,N'-dimethylpiperazine, N-methylmorpholine, N-ethylmorpholine, N-(N',N'-dimethylaminoethyl)morpholine, 1,2-dimethylimidazole, 3-(dimethylamino)propylimidazole, N,N-dimethylethanolamine, dimethylaminoethoxyethanol, N,N,N'-trimethylaminoethylethanolamine, 1,3-bis(N,N-dimethylamino)-2-propanol, N-methyl-N'-(2-dimethylaminoethyl)piperazine, bis(2-dimethylaminoethyl)ether. However, triethylenediamine and/or bis(2-dimethylaminoethyl)ether are preferable.

When a tertiary amine compound is used in a mixture with MHAP, concentration of the tertiary amine is 0 to 70%, preferably 0 to 60% by weight. When triethylenediamine is used, its concentration should be 2 to 20%, preferably 4 to 15% by weight. When the tertiary amine compound is bis(2-dimethylaminoethyl)ether, 1 to 50%, preferably 2 to 40% by weight is preferred. Further, when the tertiary amine compounds are triethylenediamine and bis(2-dimethylaminoethyl)ether, concentrations preferred are 1 to 8% and 1 to 25%, respectively, by weight.

If the amount of tertiary amine compound exceeds the above-mentioned value, the amine remaining in the polyurethane product will breed and bring about deterioration and discoloration of skin. Further, the tertiary amine, though depending on its kind, emits bad odor and causes serious problems for the personnel.

The catalyst of this invention may be applied, if necessary, in the form of a solution in water or an organic solvent. Solvents to be used include water, polyols having 2 to 4 hydroxyl groups such as ethyleneglycol, diethyleneglycol, propyleneglycol, dipropyleneglycol, butanediols, 1,6-hexanediol, and glycerine. Among them, preferable are water, ethyleneglycol, dipropyleneglycol and 1,4-butanediol. Water is a favorable solvent because it acts to lower the freezing point of the catalyst of this invention. In case water is applied, the mixing rate should be not more than 20%, preferably not more than 15%. When water is present in an amount exceeding 20%, the melting point of the catalyst of this invention is not lowered and, on the contrary, a formulation which is almost free from water does not work properly. On the other hand, the amount of organic solvents to be applied is not particularly restricted, but usually in the range from 5 to 70% by weight. A larger amount of an organic solvent makes too low a concentration of amine in the catalyst or influences unignorably the physical properties of the product.

The catalyst of the present invention, that is MHAP or a mixture of MHAP with a tertiary amine compound as promotor, is usually employed in the form of a mixture with a solvent which is selected depending on purpose. But, in the production of urethane foams, MHAP and tertiary amine may be added separately to the pre-mixed polyol solution.

For example, MHAP and an organic solvent which is added on purpose is mixed under a nitrogen atmosphere, and a tertiary amine compound as promotor is then added to the mixture.

The catalyst of this invention thus prepared can be used in the production of polyurethane foams. In usual cases, the amount of catalyst of this invention is used in an amount of 0.01 to 10 parts, preferably 0.05 to 5 parts, to 100 parts of polyol. Less than 0.01 part of the catalyst gives still low catalytic activity and requires a long time before completion of reaction. On the other hand, an amount more than 10 parts gives unfavorable effects to the physical properties of urethane foams, especially decreases the compression strength (ILD).

Polyisocyanates from which polyurethane foams can be produced with the catalyst of this invention may be known polyisocyanates including, for example, toluene diisocyanate, diphenyl methane-4,4'-diisocyanate, polymerized isocyanate, aliphatic polyisocyanate and those prepolymers containing free isocyanate which are produced by the reaction of the mentioned compounds with polyols.

Polyols to be used in this invention include known polyesterpolyols, polyetherpolyols, polymer polyols and the mixture thereof. Known polyesterpolyols usually include those compounds which are derived usually from dibasic acid and polyhydric alcohol. Known polyols concerned are polyether polyols and amine polyols. Polyether polyols are obtained from polyhydric alcohols such as glycol, glycerine, pentaerythritol, trimethylolpropane and saccharose by the addition reaction with ethylene oxide or propylene oxide. Amine polyols are produced by the addition of amine compound such as ammonia, aliphatic and aromatic amine compounds with ethylene oxide or propylene oxide.

Known polymer polyols include those which are produced from corresponding polyether polyol reacting with ethylenic unsaturated monomers such as butadiene, acrylonitrile, and styrene in the presence of a radical polymerization catalyst. In this invention, a cross-linking agent or a chain-extending agent may be added if necessary. The cross linking agent and the chain-extending agent mentioned include polyhydric alcohols of a low molecular weight such as ethyleneglycol, 1,4-butanediol, glycerine and polyamine polyols of a low molecular weight such as diethanol amine, triethanol amine and polyamines such as ethylenediamine, xylylenediamine and methylene-bis-ortho-chloroaniline.

If necessary in this invention, a blowing agent may be used which is selected from the group consisting of halogenated methanes such as freon 11, freon 12, methylene chloride and water.

Further, surfactants such as organic silicon compounds coloring agent, flame retardant and other known additives may be added if necessary. The kind and amount of the additives should be in accordance with ordinary usages without going far beyond known procedure.

The method of producing polyurethane in which the catalyst of this invention is applied is a previously known one. It is applicable to the one shot method and also to the prepolymer method. The process for producing polyurethane foams of this invention is particularly useful with molded polyurethane coated with skin, but it is also applied with success to producing foams by the hot mold, semi-hot mold, HR mold and the RIM method.

When skin is made from vinyl chloride, polyurethane foams with skin is produced by so-called vacuum mold and slush mold processes, and this invention is applied to either of the processes. For the skin being made from polyurethane elastomer, the integral skin urethane foam process is the best known one and the molding of the foam has recently been carried out almost solely by the RIM mold process, to which the present invention is also applied with success.

Polyurethane foams coated with skin have been used for a variety of industrial products. These products were mostly black colored and therefore discoloration of the foams has not been a serious problem. However, it is a recent trend to color industrial products and many of them are colored brightly.

In this connection, there has not been any solution to amine catalysts. Now, the problem is solved for the coloration of polyurethane foams coated with skin. At the same time, the amine catalyst which has been used against the worker's will because of its bad odor could be replaced to improve labor conditions. In addition, it is now possible to reduce the thickness of the skin which has been made necessarily thick to minimize the trouble of discoloration. This is also effective to reduce the cost of manufacturing.

DESCRIPTION OF THE PREFERRED EMBODIMENT

The present invention will be better understood from the following description made with reference to Examples and Comparison Examples. However, it should be understood that the present invention is not restricted to these Examples.

[Preparation of Catalyst]

Catalysts used in the following examples, each named by a letter of the alphabet, were prepared from tertiary amine(s) and solvent(s), as specified in Table 1, in a 500 ml 4-necked flask provided with a stirrer in a nitrogen atmosphere.

TABLE 1

| Symbol of Catalyst | (in wt. %) | | | | | |
|---|---|---|---|---|---|---|
| | O | P | Q | R | S | T |
| MHEP[1] | 90.0 | 86.4 | 56.7 | 60.0 | 65.0 | |
| BDMEE[2] | | 3.6 | 25.9 | | 15.0 | |
| TEDA[3] | | | | 11.1 | 7.0 | |
| DPG[4] | 10.0 | 10.0 | 17.4 | 28.9 | 25.0 | |
| MHPP[5] | | | | | | 100 |

[1] 4-Methyl-1-(2-hydroxyethyl)piperazine
[2] Bis-(2-dimethylaminoethyl)ether
[3] Triethylenediamine
[4] Dipropyleneglycol
[5] 4-Methyl-1-(2-hydroxypropyl)piperazine

[Examples of Foaming Tests]

EXAMPLES 1, 2, 3 AND 4

Using the catalysts O, P, Q and T specified in Table 1, foaming test was carried out with the following formulation. Results are shown in Table 2.

(1) Formulation

| | pbw |
|---|---|
| Polyol I | 100 |
| Polyol II | 5.0 |
| Water | 2.0 |
| Triethanolamine | 5.0 |
| Catalyst | varied |
| Isocyanate I | 57.5 |
| | (Index 105) |

Remarks:
Polyol I;
Product from Sumitomo-Bayer Urethane Co.
Trade name, Sumiphen 3063
OH value, 28 mg KOH/g
Polyol II;
Product from Sumitomo-Bayer Urethane Co.
Trade name, S.B.U. Polyol 0480
OH value, 550 mg KOH/g
Isocyanate I;
Product from Sumitomo-Bayer Urethane Co.
Trade name, Sumidure 44v20
NCO group content 31% with crude MDI (2) Foaming Test Conditions Temperature of raw material solution, 20±1° C.
Speed of agitation, 5000 rpm. (for 5 min.)
Temperature of mold, 35°~38° C.

(3) Items of Measurement (1) Density of foam
A predetermined amount of solution was poured in a 2 liter beaker, and the foaming reaction was completed. A 7 cm×7 cm×6 cm portion was cut at the center of the foam and submitted to the measurement.

(2) Hardness of foam
Using the above-mentioned foam sample, compressive strength of the foam was measured when the foam was compressed by 40%.

(3) Flow property
A certain amount of a mixed solution was injected from the bottom of an aluminum mold of 50 cm length, 12 cm width and 0.5 cm thickness which was placed on a 25° slant, the foaming reaction was completed. The distance of flow of the produced foam was measured.

(4) Discoloration test

A test piece for the discoloration test was prepared by pouring raw material of polyurethane onto a vinyl chloride resin (GR-20 from Plastech Co.) which was then foamed. The piece obtained was heated in an oven at 80° C. and the discoloration in 400 hr. estimated with a color meter was expressed by the color difference (ΔE).

(5) Odor

With the catalysts employed in the foaming tests, odor of the catalysts was expressed by the following symbols:
⊚ : Very weak
○ : Weak
×: Strong
××: Very strong

COMPARISON EXAMPLES 1 AND 2

Foaming tests were conducted in the same manner as in Example 1, except that the catalysts used were TEDA-L33 (a 33.3% solution triethylenediamine in dipropyleneglycol, supplied from Toyo Soda Industry Co., Ltd.) and TEA (triethylamine). Results are shown in Table 2.

TABLE 2

| No. of Example | Example | | | | Comparison Example | | |
|---|---|---|---|---|---|---|---|
| | 1 | 2 | 3 | 4 | 1 | 2 | |
| Catalyst (symbol and name) | O | P | Q | T | TEDA-L33 | TEA | Blank[2] test |
| Catalyst (pbw) | 1.30 | 1.30 | 0.48 | 1.71 | 0.41 | 0.68 | — |
| Reaction rate[1] | | | | | | | |
| CT (sec) | 23 | 19 | 19 | 24 | 26 | 22 | — |
| GT (sec) | 75 | 65 | 75 | 75 | 75 | 75 | — |
| RT (sec) | 94 | 79 | 92 | 95 | 103 | 96 | — |
| Physical properties | | | | | | | |
| Density (kg/m$^3$) | 96.8 | 86.0 | 74 | 96.5 | 132 | 87.3 | — |
| Hardness (kg/cm$^2$) | 0.30 | 0.23 | 0.15 | 0.28 | 0.77 | 0.24 | — |
| Flow property (cm) | 26 | 32 | 43 | 26 | 16 | 30 | — |
| Discoloration (Δ) | 26.3 | 26.7 | 28.5 | 26.8 | 40.5 | 25.3 | 24.6 |
| Odor | ⊚ | ⊚ | ○ | ⊚ | ○ | ×× | — |

[1]CT: Cream time GT: Gel time RT: Rise time
[2]Blank test: Discoloration of vinyl chloride resin without polyurethane foam.

EXAMPLES 5 AND 6

Using catalysts R and S appearing in Table 1, the foaming test was conducted with the following formulation. Results obtained are shown in Table 3.

(1) Formulation

| | pbw |
|---|---|
| Polyole III | 60 |
| Polyol IV | 40 |
| Water | 2.7 |
| Silicone | 2.0 |
| Catalyst | varied |
| Isocyanate II | 34.0 |
| | (Index 105) |

Remarks:
Polyol III;
Product of San'yo Chemical Co.
Trade name, FA-703
OH value, 33 mg KOH/g
Polyol IV;
Product of San'yo Chemical Co.
Trade name, FA-728
OH value, 28 mg KOH/g
Silicone I;
Product of Toray Silicone Co.
Trade name, SRX-274C
Silicone surfactant Isocyanate II;
Product of Nippon Polyurethane Co.
Consisting of T-81/MR-200 = 80/20
(TDI and crude MDI blended)

(2) Foaming Test Conditions

Temperature of raw material solution, 20±1° C.
Stirring speed, 6000 rpm (5 sec.)
Mold temperature, 50±2° C.

(3) Items of Measurement (1) Reaction profiles
Foaming reaction was performed in a 2 liter polyethylene beaker and CT, GT and RT were estimated.

(2) Discoloration test
Foam prepared in a 2 liter polyethylene beaker by foaming was pasted with a piece of gray vinyl chloride resin, and the change of color was observed in 400 hours during which period the object was kept at 80° C.

COMPARISON EXAMPLES 3 AND 4

The same foaming tests as in Example 4, except that the catalysts used were TEDA-L33 and TMHMDA (N,N,N',N'-tetramethylhexamethylenediamine), was conducted with the results shown in Table 3.

TABLE 3

| | Example | | Comparison Example | |
|---|---|---|---|---|
| No. of Example | 4 | 5 | 3 | 4 |
| Catalyst (symbol and name) | R | S | TEDA-L33 | TMHMDA |
| Amount of catalyst (pbw) | 1.55 | 1.31 | 1.00 | 0.75 |
| Reaction rate | | | | |
| CT (sec) | 5 | 4 | 5 | 5 |
| GT (sec) | 80 | 80 | 80 | 80 |
| RT (sec) | 106 | 112 | 107 | 108 |
| Discoloration test | Almost no change | Almost no change | Darkened | Darkened |

What is claimed is:

1. A process for producing a polyurethane foam coated with a skin comprising forming an unfoamed skin of a polyurethane elastomer or of a vinyl chloride resin in a mold and reacting an organic polyisocyanate with a polyol and foaming with a blowing agent in the presence of a 4-methyl-1-(2-hydroxyalkyl)piperazine in the mold.

2. A process according to claim 1 wherein the skin is made from a polyurethane elastomer.

3. A process according to claim 1 wherein the skin is made from a vinyl chloride resin.

4. A process according to claim 1 wherein piperazine has 2 to 4 carbon atoms in the hydroxyalkyl group.

5. A process according to claim 4 wherein the hydroxyalkyl group is hydroxyethyl.

6. A process according to claim 4 wherein the hydroxyalkyl group is hydroxypropyl.

7. A process according to claim 1 comprising adding another tertiary amine as a promotor.

8. A process according to claim 7 wherein the promotor is triethylenediamine bis-(2-dimethyl-amino ethyl)ether or a mixture thereof.

9. A process according to claim 8 wherein the concentrations of 4-methyl-1-(2-hydroxyalkyl)piperazine and bis-(2-dimethylaminoethyl)ether are 98 to 50% and 1 to 50%, respectively, by weight based on the two materials.

10. A process according to claim 8 wherein there are employed 4-methyl-1-(2-hydroxyalkyl)piperazine, triethylenediamine and bis-(2-dimethylaminoethyl)ether in an amount of 98 to 67%, 1 to 8% and 1 to 25%, respectively, by weight based on these three materials.

11. A process according to claim 8 wherein the concentrations of 4-methyl-1-(2-hydroxyalkyl)piperazine and triethylenediamine are 98 to 85% and 2 1 to 20% respectively, by weight based on these two materials.

12. A process according to claim 1 comprising including a solvent with the 4-methyl-1-(2-hydroxyalkyl)piperazine.

13. A process according to claim 12, wherein the solvent is selected from the group consisting of dipropylene glycol, ethylene glycol, 1,4-butanediol and water.

14. A process according to claim 13, wherein water is the solvent and the concentration of the piperazine is not more than 15% by weight.

* * * * *